United States Patent
Kim et al.

(10) Patent No.: US 12,335,388 B2
(45) Date of Patent: Jun. 17, 2025

(54) ELECTRONIC DEVICE FOR GENERATING MNEMONIC PHRASE OF PRIVATE KEY AND OPERATION METHOD IN THE ELECTRONIC DEVICE

(71) Applicant: Samsung Electronics Co., Ltd., Gyeonggi-do (KR)

(72) Inventors: Bumhan Kim, Gyeonggi-do (KR); Eunbi Kim, Gyeonggi-do (KR); Hansang Song, Gyeonggi-do (KR); Seungwon Shin, Gyeonggi-do (KR)

(73) Assignee: Samsung Electronics Co., Ltd, Suwon-si (KR)

(*) Notice: Subject to any disclaimer, the term of this patent is extended or adjusted under 35 U.S.C. 154(b) by 32 days.

(21) Appl. No.: 17/891,383

(22) Filed: Aug. 19, 2022

(65) Prior Publication Data
US 2023/0053891 A1 Feb. 23, 2023

Related U.S. Application Data

(63) Continuation of application No. PCT/KR2022/012353, filed on Aug. 18, 2022.

(30) Foreign Application Priority Data

Aug. 20, 2021 (KR) .......................... 10-2021-0110320

(51) Int. Cl.
*H04L 9/08* (2006.01)
*H04L 9/14* (2006.01)

(52) U.S. Cl.
CPC .............. *H04L 9/14* (2013.01); *H04L 9/0861* (2013.01)

(58) Field of Classification Search
CPC ..... H04L 9/14; H04L 9/16; H04L 9/08; H04L 9/0861
(Continued)

(56) References Cited

U.S. PATENT DOCUMENTS 6,704,868 B1 * 3/2004 Challener ............. H04L 9/0863
713/168
11,093,934 B2 * 8/2021 Lu ......................... H04L 9/0861
(Continued)

FOREIGN PATENT DOCUMENTS

CN 107453862 A 12/2017
CN 108768631 A 11/2018
(Continued)

OTHER PUBLICATIONS

International Search Report dated Nov. 18, 2022.
Extended European Search Report dated Sep. 10, 2024.
Password Strength Wikipedia XP 93200617.

*Primary Examiner* — Bharat Barot
(74) *Attorney, Agent, or Firm* — Cha & Reiter, LLC

(57) ABSTRACT

The disclosure relates to an electronic device for generating a mnemonic phrase of a private key and an operation method in the electronic device. The electronic device may comprise a memory, a display module, and at least one processor electrically connected with the memory and the display module. The at least one processor may be configured to generate a private key and a public key, generate a first mnemonic phrase including a designated first number of words based on a structure of the private key, identify a user phrase input by a user, generate a second mnemonic phrase including a second number of words identified based on a security level obtained by analyzing the user phrase, and control the display module to display the generated second mnemonic phrase. Other embodiments are possible.

20 Claims, 12 Drawing Sheets

(58) Field of Classification Search
USPC .................................................. 713/188–189
See application file for complete search history.

(56) References Cited

U.S. PATENT DOCUMENTS

| | | | | |
|---|---|---|---|---|
| 11,374,750 | B2* | 6/2022 | Dolan | H04L 9/0861 |
| 11,444,755 | B2* | 9/2022 | Christensen | H04L 9/14 |
| 11,444,761 | B2* | 9/2022 | Adams | H04L 9/14 |
| 11,652,625 | B2* | 5/2023 | Hunsberger | H04L 9/0822 |
| | | | | 380/282 |
| 12,052,347 | B2* | 7/2024 | Ornelas | H04L 9/085 |
| 12,143,487 | B2* | 11/2024 | Lu | H04L 9/0863 |
| 2003/0105980 | A1* | 6/2003 | Challener | G06F 21/46 |
| | | | | 726/7 |
| 2016/0294802 | A1 | 10/2016 | Xiao et al. | |
| 2019/0362340 | A1 | 11/2019 | Strong et al. | |
| 2020/0026834 | A1* | 1/2020 | Vimadalal | H04L 63/0861 |
| 2020/0076592 | A1 | 3/2020 | Kong | |
| 2020/0228349 | A1* | 7/2020 | Basu | H04L 9/0869 |
| 2021/0409213 | A1 | 12/2021 | Lu et al. | |

FOREIGN PATENT DOCUMENTS

| | | | |
|---|---|---|---|
| CN | 109474420 | A | 3/2019 |
| CN | 111026876 | A | 4/2020 |
| CN | 111651964 | A | 9/2020 |
| KR | 10-2017-0131467 | A | 11/2017 |
| KR | 10-2020-0001178 | A | 1/2020 |
| KR | 10-2021-0083999 | A | 7/2021 |
| WO | 2019/143584 | A1 | 7/2019 |
| WO | 2020/024720 | A1 | 2/2020 |
| WO | 2020/134591 | A1 | 7/2020 |

* cited by examiner

ELECTRONIC DEVICE FOR GENERATING MNEMONIC PHRASE OF PRIVATE KEY AND OPERATION METHOD IN THE ELECTRONIC DEVICE

CROSS-REFERENCE TO RELATED APPLICATION(S)

This application is a continuation of International Application No. PCT/KR2022/012353 designating the United States, filed on Aug. 18, 2022, in the Korean Intellectual Property Receiving Office and claiming priority to Korean Patent Application No. 10-2021-0110320, filed on Aug. 20, 2021, in the Korean Intellectual Property Office, the disclosures of which are incorporated by reference herein in their entireties.

BACKGROUND

Technical Field

The disclosure relates to an electronic device for generating a mnemonic phrase (mnemonic words) for generating, restoring, or backing up a private key in a security system, and an operation method in the electronic device.

Description of Related Art

Recent generations of electronic devices are often provided in various form factors, for increasing user convenience and providing an increasing variety of services and functions.

One such service includes security for e-wallets, such as by using blockchains. An e-wallet may include a data structure used for storing and managing a user's security key, which may include a keychain having a key pair in the form of a public key and a private key. A user can prove ownership of financial accounts, crypto-coins or other security-enabled user information using the keys stored in the e-wallet.

When generating a private key using the e-wallet, the private key may be generated using a random number generator (RNG), and a public key may be generated in tandem, taking on a certain value which can be shared publicly. That is, the private key should be managed more securely by the owner, and be prevented from exposure to others, whereas the public key, being commonly issued in the form of a certificate, can be shared more openly.

Security systems such as blockchains (which have recently gained in popularity) may generate private keys via more specialized methods. In traditional security systems, the private key is securely managed. However, the private key may be backed-up and restored via a particular algorithm, which can regenerate the private key when the user inputs a certain dataset or characteristic.

Because the private key typically involves a numerical value (e.g., a binary number) that cannot be readily recognized by the human eye, or remembered via human memory, the private key typically must be converted into a mnemonic phrase that is recognizable and memorizable by a user, so that the user can write it down for future safekeeping.

SUMMARY

With conventional e-wallets, when many keys are generated, it may be difficult for a user to memorize and/or record all the corresponding mnemonic phrases for all keys. Furthermore, the mnemonic phrases may be lost or misplaced, resulting in loss of keys, security incidents, etc. Unless each key is backed up (e.g., in case of theft or device failure, it cannot be restored `

According to an embodiment of the disclosure, there may be provided an electronic device for safely managing a mnemonic phrase of a private key, and generating a mnemonic phrase for easily recall, while maintaining a constant level of security, and an operational method for the same in the electronic device.

According to an embodiment of the disclosure, an electronic device includes an input/output (IO) module, a memory, a display module, at least one processor electrically connected with the memory, the IO module, and the display module, wherein the memory stores instructions that are executable to enable the at least one processor to: generate a private key and a public key, generate a first mnemonic phrase including a designated first number of words based on a structure of the private key, receive a first user phrase via the IO module, generate a second mnemonic phrase including a second number of words identified based on a first security level generated from analyzing the received first user phrase, and control the display module to display the generated second mnemonic.

According to an embodiment, a method for operation in an electronic device includes: generating, via at least one processor, a private key and a public key, generating a first mnemonic phrase including a designated first number of words based on a structure of the private key, receiving, via an input/output (IO) module, a first user phrase, generating a second mnemonic phrase including a second number of words identified based on a first security level generated from analyzing the received first user phrase, and displaying the generated second mnemonic phrase on a display module of the electronic device.

According to an embodiment, there may be provided a non-transitory storage medium storing one or more program, the one or more program comprising executable instructions configured to, when executed by at least one processor an electronic device, cause the electronic device to: generate a private key and a public key, generate a first mnemonic phrase including a designated first number of words based on a structure of the private key, receive a first user phrase via an input/output (IO) module, generate a second mnemonic phrase including a second number of words identified based on a first security level generated from analyzing the user phrase, and display the generated second mnemonic phrase on a display module of the electronic device.

According to an embodiment, an electronic device is disclosed herein that can generate a mnemonic phrase for private key, and an operational method for the same, by which a mnemonic phrase related to the key may be more easily recalled, via a user phrase uttered by the user. This may reduce a number of mnemonic phrases that a user must memorize, and facilitate management of mnemonic phrases and security keys.

BRIEF DESCRIPTION OF THE DRAWINGS

The same or similar reference denotations may be used to refer to the same or similar elements throughout the specification and the drawings.

DETAILED DESCRIPTION

An embodiments of the present disclosure are now described with reference to the accompanying drawings. As used herein, the term "user" may denote a human or another device using the electronic device.

Figure 1:
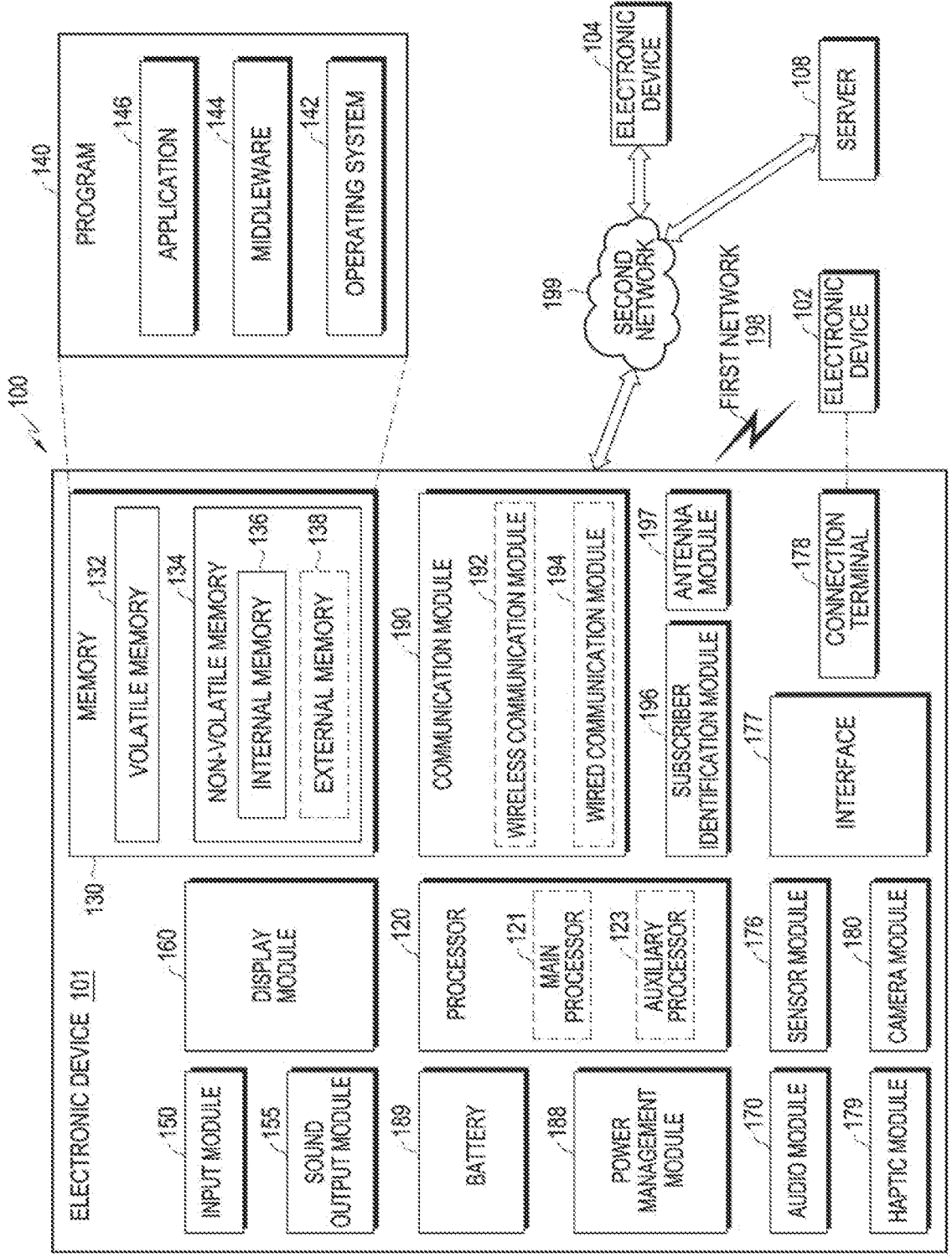
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
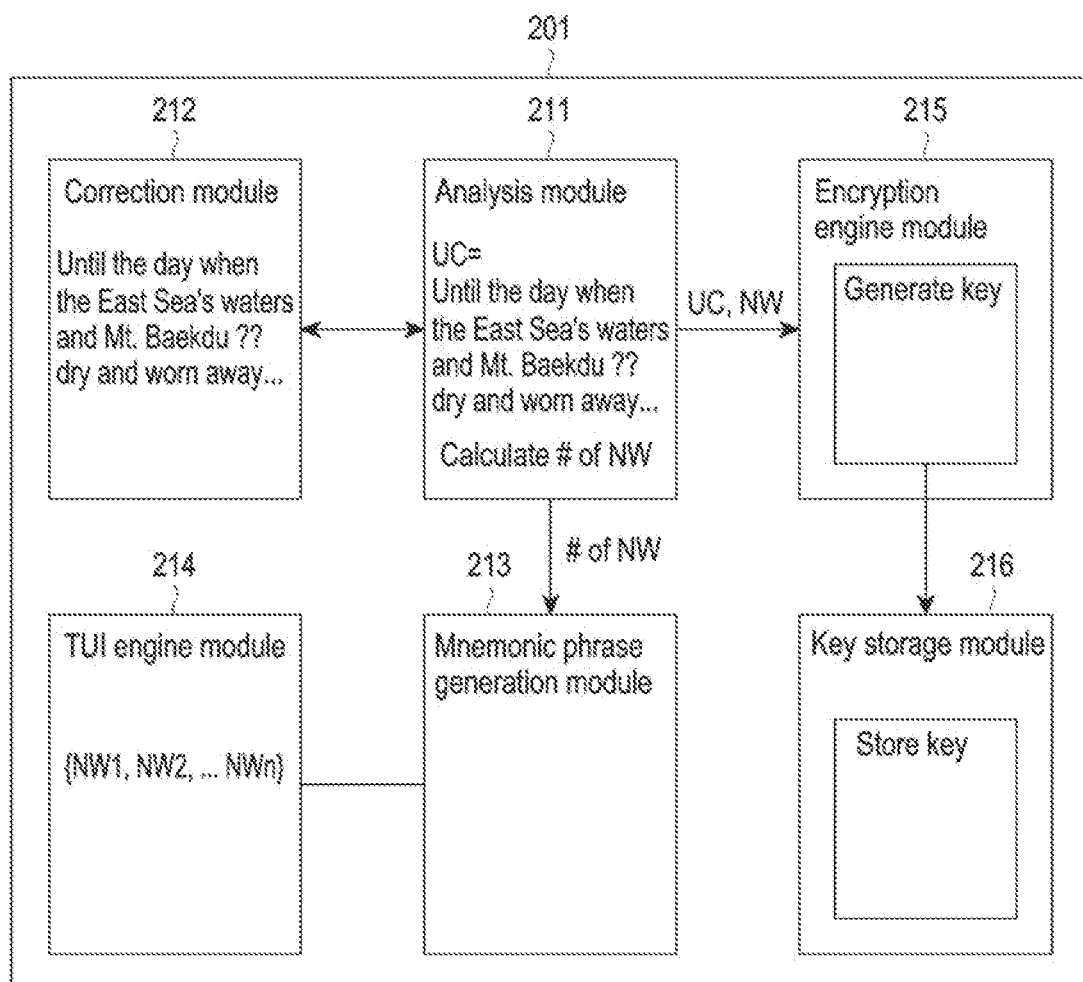
FIG. 2 is a view illustrating a configuration of a software module in an electronic device according to an embodiment.

FIG. 2 is a view illustrating an example of a configuration of a software module in an electronic device according to an embodiment.

Referring to FIGS. 1 and 2, according to an embodiment, an electronic device 101 may implement a software module 201 (e.g., the program 140 of FIG. 1) for generating a mnemonic phrase for generating, backing up, or restoring a private key (or signature key). The memory 130 of the electronic device 101 may store commands (e.g., instructions) for implementing the software module 201 of FIG. 2. At least one processor 120 may execute the instructions stored in the memory 130 for implementing the software module 201 and control hardware (e.g., the input module 150 or display module 160) associated with the function of the software module 201. The mnemonic phrase may be a word sequence of words randomly generated in any number, used as a key (or seed) utilized to derive a wallet of a cryptographic system.

According to an embodiment, the shielding member 201 of the electronic device 101 may include an analysis module (entropy) 211, a correction module (e.g., a "canonicalizer") 212, a mnemonic phrase generation module 213, a trusted user interface (TUI) engine module 214, an encryption engine module 215, and/or a key storage module (secure storage) 216. According to an embodiments, the software module 201 may omit the correction module 212 and may analyze the user phrase entered by the user, as it is, by the analysis module 211.

According to an embodiment, the analysis module 211 may receive the user phrase input from the user through an input module 150 or the user phrase corrected through the correction module 212, and analyze the input user phrase. The analysis module 211 may obtain the security level (or ratio) according to the result of analysis and set a number of mnemonic phrases utilized, based on the obtained security level. For example, the analysis module 211 may generate entropy (e.g., a hash value with a 128 or 256 random value and a four-bit checksum) for the private key based on the structure of the private key, divide the generated entropy into a number (e.g., 12 or more) of segments by a designated bit value (e.g., 11 bits), and set a designated first number (e.g., 12 or more) of the word length corresponding to the divided segments. For example, when a user phrase is input, the analysis module 211 may set a second number (e.g., five) corresponding to the word length for the rest except for a portion of the entropy to reflect the result value of analysis of the input user phrase. The analysis module 211 may transfer, to the encryption engine 215, a mnemonic phrase (e.g., a first mnemonic phrase or a second mnemonic phrase) including as many words NW1, NW2, . . . , NWn as the set number of the mnemonic phrase, generated by the mnemonic phrase generation module 213 and the user phrase (UC).

According to an embodiment, the correction module 212 may correct at least one of typos, spaces, nonstandard characters, and unsupported characters of the user phrase input by the user through the input module 150. The correction module 212 may transfer the user phrase, resultant from correcting some text of the user phrase, to the display module 160.

According to an embodiment, the mnemonic phrase generation module 213 may generate a mnemonic phrase (e.g., a first mnemonic phrase) including a first number (e.g., 12 or more) of words specified by the standard of the private key structure and, when the user phrase is input, generate a mnemonic phrase (e.g., a second mnemonic phrase) including a number (e.g., a second number) of mnemonic phrases (# of NW) of words set by the analysis module 211. The mnemonic phrase generation module 213 may generate a mnemonic phrase set based on the set second number and the private key. Here, the second number may be set to be smaller than the first number.

According to an embodiment, the trusted user interface engine module 214 may configure instructions that are configured to enable the generated mnemonic phrase to be safely displayed on the display module 160 and configure the mnemonic phrase not to be captured to safely defend the generated mnemonic phrase against unauthorized applications or functions.

According to an embodiment, the encryption engine module 215 may generate a private key and a public key based on the mnemonic phrase (e.g., first mnemonic phrase) generated by the mnemonic phrase generation module 213. The encryption engine module 215 may generate the private key and the public key based on the mnemonic phrase (e.g., the second mnemonic phrase or third mnemonic phrase) generated by the mnemonic phrase generation module 213 and the user phrase UC transferred from the analysis module 211.

According to an embodiment, the key storage module (secure storage) 216 may be configured to safely store the generated private key in the memory 130.

According to an embodiment, the software module 201 of the electronic device 101 may include a kernel (or HAL), a framework (e.g., the middleware 144 of FIG. 1) and an application (e.g., the application 146 of FIG. 1). At least part of the program module 201 may be preloaded on the electronic device 101 or may be downloaded from a server (e.g., the server 108).

According to an embodiment, the components of the software module 201 and the names of the components may be varied depending on the type of the operating system. According to an embodiment, at least a part of the software module 201 may be implemented in software, firmware, hardware, or in a combination of two or more thereof. At least part of the software module 201 may be implemented (e.g., executed) by e.g., a processor (e.g., an AP). At least a part of the software module 201 may include at least one of, e.g., a module, program, routine, set of instructions, process, or the like for performing at least function.

Figure 3:
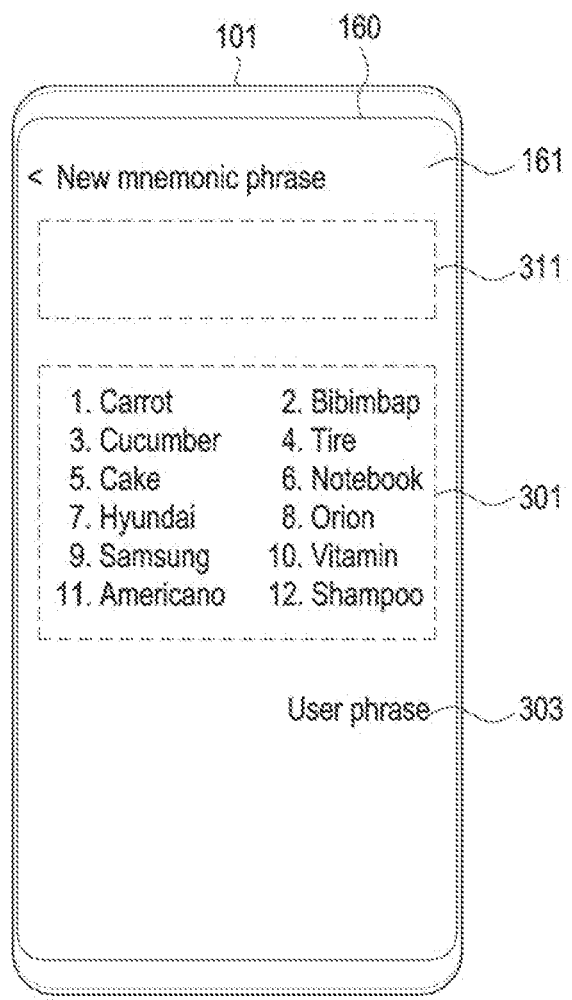
FIG. 3 is a view illustrating an example of generating a mnemonic phrase in an electronic device according to an embodiment.

FIG. 3 is a view illustrating an example of generating a mnemonic phrase in an electronic device according to an embodiment. FIGS. 4A, 4B, 4C, and 4D are views illustrating an example of generating a mnemonic phrase in an electronic device according to an embodiment.

Referring to FIGS. 1, 2, and 3, according to an embodiment, the processor 120 of the electronic device 101 (e.g., the electronic device 101 of FIG. 1) may execute instructions stored in the memory 130 to execute the function of the software module 201 (e.g., the processor 140 of FIG. 1) to generate a mnemonic phrase. The processor 120 may execute an application related to security system to generate a mnemonic phrase and generate a private key and control the display module 160 to display a screen (e.g., a user interface (UI)) 161 for generating a mnemonic phrase. For example, the screen (e.g., a first screen) 161 of the application may display guide information 311 related to generation of a mnemonic phrase of the user and/or a start button (e.g., an object, menu, or execution icon) (not shown).

According to an embodiment, the processor 120 may generate a private key and a public key in response to receiving a mnemonic phrase generation request (e.g., input selection of a start button) from the user. For example, the private key and the public key may be generated by an elliptic curve digital signature algorithm (ECDSA) or an encryption algorithm having the same concept. The processor 120 may convert the generated private key (e.g., binary number) into a mnemonic phrase including a designated first number (e.g., 12 or more) of words that may be identified by the user (hereinafter, referred to as a first mnemonic phrase 301) and control the display module 160 to display the converted first parameter 301 on the screen 161 of the application. For example, the first mnemonic phrase 301 may be randomly generated with words (e.g., carrot, bibimbap, cucumber, tire, cake, notebook, Hyundai, Orion, Samsung, vitamin, Americano, and shampoo) that are easy to recognize by the user, and it may be changed every time the private key is created. The processor 120 may control the display module 160 to display, on the application screen 161, a user phrase button (e.g., an object, menu, or execution icon) for the user to directly input the user phrase (e.g., user credential) to generate a private key.

Figure 4A:
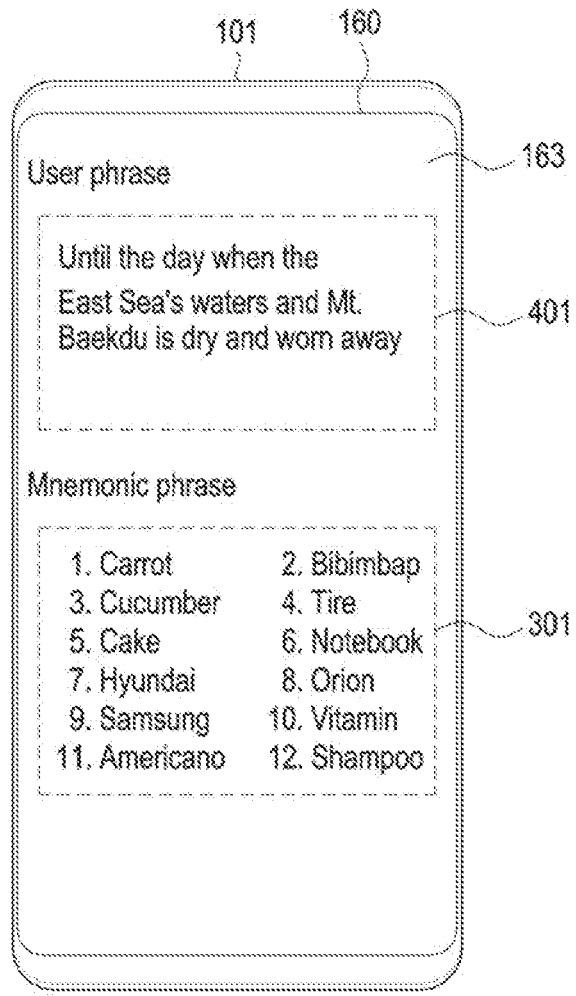
FIGS. 4A, 4B, 4C, and 4D are views illustrating an example of generating a mnemonic phrase in an electronic device according to an embodiment.

According to an embodiment, as shown in FIG. 4A, the processor 120 may display a screen (e.g., a second screen) 163 for receiving an input of the user phrase 401 from the user. The processor 120 may control the display module 160 to display, on the screen 163, information (not shown) prompting input of the user phrase, before receiving the user phrase from the user, objects related to the user phrase, and/or the first mnemonic phrase 301. For example, the processor 120 may omit display of the first mnemonic phrase 301 on the screen 163 prior to and during in-progress input of the user phrase 401. For example, upon generating a mnemonic phrase according to the input of the user phrase 401, the processor 120 may omit display the first mnemonic phrase 301 on the screen 161 of FIG. 3 and the screen 163 of FIG. 4A.

According to an embodiment, in response to detecting selection of the user phrase button 303, the processor 120 may retrieve the user phrase (e.g., "Until the day when the East Sea's waters and Mt. Baekdu is dry and worn away") 401 as previously input by the user, and display the input user phrase 401 on the screen 163 as shown in FIG. 4A.

Figure 4B:
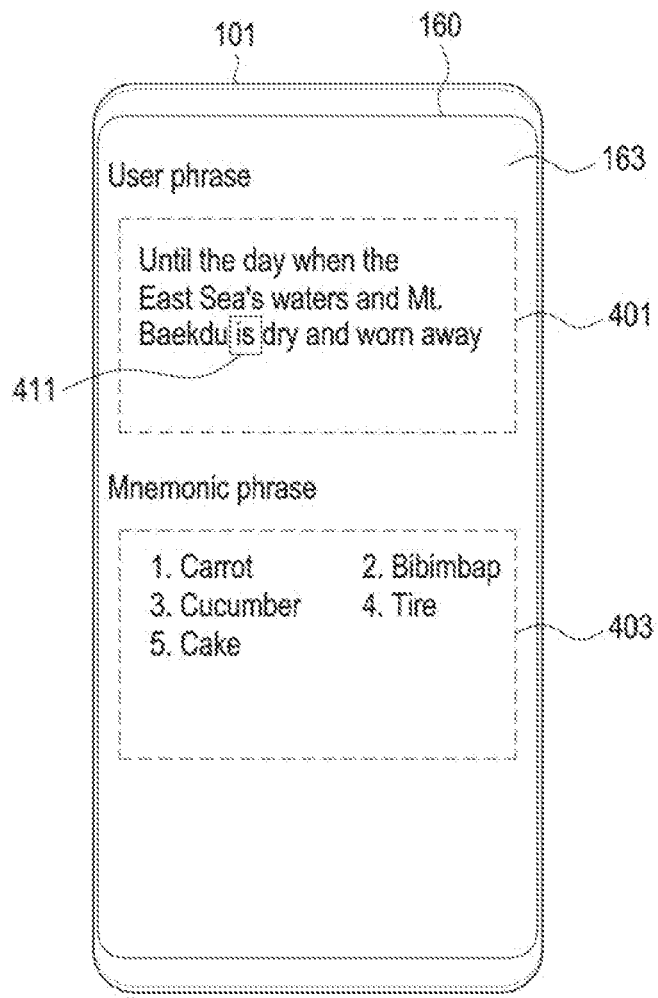

According to an embodiment, as shown in FIG. 4B, the processor 120 may identify and correct errors in the input user phrase, such as typos, spacing errors, nonstandard characters, and/or unsupported characters (e.g., "Until the day when the East Sea's waters and Mt. Baekdu is dry and worn away") 401. For example, the processor 120 may change the typo (e.g., "is" in "Mt. Baekdu is") into the corrected text (e.g., "are") 411, and may control the display module 160 to display the corrected text-applied user phrase ("Until the day when the East Sea's waters and Mt. Baekdu are dry and worn away") 401. For example, if there is no text to be corrected in the input user phrase 401, the processor 120 may control the display module 160 to maintain the display of the input user phrase 401.

According to an embodiment, the processor 120 may analyze the input (and sometimes corrected) user phrase 401 and obtain a security level (or ratio) based on the results of the analysis. The processor 120 may identify a second number utilized to generate the mnemonic phrase based on the obtained security level. Here, the second number may be set so as to be smaller than the first number. The security level may indicate the security degree (or strength) of the private key to be generated by combining the user phrase and the mnemonic phrase, and it may be visually represented to the user via the display.

According to an embodiment, as shown in FIG. 4B, the processor 120 may generate a mnemonic phrase including a set second number (e.g., 5) of words (e.g., carrot, bibimbap, cucumber, tire and cake) (hereinafter referred to as a second mnemonic phrase 403), and may display the generated second mnemonic phrase 403 on the screen 163. For example, the processor 120 may generate the second mnemonic phrase 403 by sequentially or randomly selecting the second number of words of the first mnemonic phrase 301. As another example, the processor 120 may randomly generate new words for the second mnemonic phrase 403, separate from the first mnemonic phrase 301. For example, when the input of the user phrase is completed, the processor 120 may generate a second mnemonic phrases 403 (newly generated), all different from the first mnemonic phrases 301 displayed in the mnemonic phrase display area on the screen 163. As another example, the processor 120 may sequentially display the words included in the second mnemonic phrase 403 according to the length of the inputted user phrase while the user phrase is being input and, if the input of the user phrase is completed, may display all words of the final calculated number (e.g., the second number) included in the second mnemonic phrase 403.

Figure 4C:
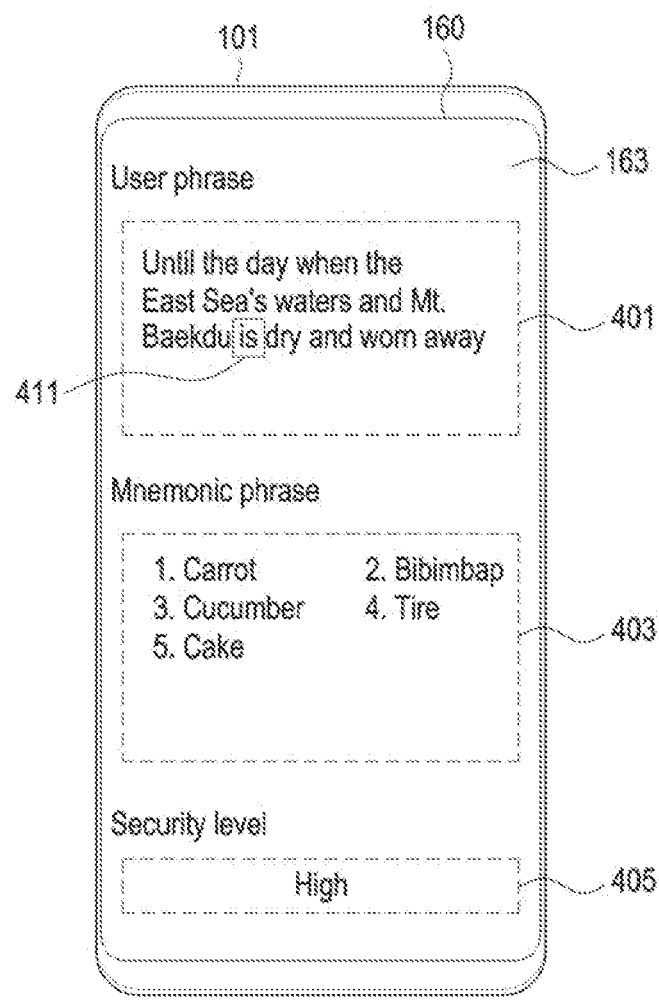

According to an embodiment, the processor 120 may display information (at least one of text, color, symbol, or image) 405 indicative of the determined security level on the screen 163 as shown in FIG. 4C, For example, when the security level is larger than or equal to a designated threshold, the processor 120 may control the display module 160 to display text (e.g., "high" and/or blue) indicating sufficiency of a current security level, based on the user phrase and mnemonic phrase.

According to an embodiment, the processor 120 may control the display module 160 to display, on the screen 163, guide information for prompting additional inputs for the user phrase, when the security level is determined to be less than a designated sufficiency threshold, For example, when the security level is less than the designated threshold, the processor 120 may control the display module 160 to display, on the screen 163, text (e.g., "low" and/or red) indicating that the security level is not safe, and/or a guide prompt, such as "Please input additional user phrase." When the security level is determined to be insufficient, and the additional user phrase is received, the processor 120 may analyze the additionally input user phrase, redetermined a corresponding security level, generate a third number of third mnemonic phrases based on the obtained security level, and control the display module 160 to display the generated third mnemonic phrase. Here, the third number may be smaller than the first number and larger than the second number.

Figure 4D:
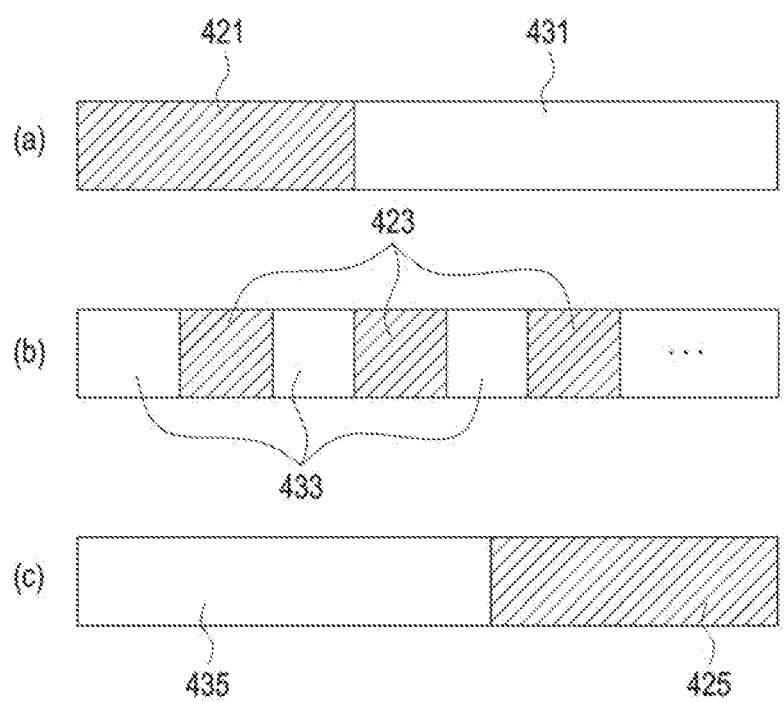

According to an embodiment, as shown in FIG. 4D, the processor 120 may generate a second mnemonic phrase for a private key, to which the user's own secret phrase has been applied, by combining the user phrase input from the user, and a private key (or seed) randomly generated as a random number. The processor 120 may generate the private key (or a first number of first mnemonic phrases obtained by converting the private key), generated as a random number, previously or whenever a user phrase is input. For example, the processor 120 may generate entropy for mnemonic phrase (e.g., a hash value with a 128 or 256 random value and a 4-bit checksum), divide the entropy of the mnemonic phrase into a designated first number of (e.g., 12 or more) segments (e.g., 12 or more 11-bit segments), and set a word length corresponding to each segment.

According to an embodiment, upon previously generating the mnemonic phrase, the processor 120 may generate a first number of first mnemonic phrases corresponding to the first number of word length (e.g., 128 or 256 random value). If the user phrase is input, the processor 120 may apply the resultant value of analyzing the input user phrase to overwrite, or by exclusive OR (XOR) operation to, a designated portion 421 (*a*) of FIG. 4D, a designated portion 423 (*b*), or a designated portion 425 (*c*), as the area corresponding to a portion of the first mnemonic phrase in the entropy. Here, the resultant value of the user phrase may be a function calculated by analyzing the user phrase. The function may be a cryptographically secure one-way function (e.g., a pseudo random function) implemented using a hash or encryption algorithm. The processor 120 may calculate the remaining portion 431, 433 or 435 except for the designated portion 421, 423 or 425 from the entropy (e.g., length of more than 12 words) of the mnemonic phrase as the length of the mnemonic phrase, set a number (e.g., the second number) corresponding to the calculated length, and generate the set number of mnemonic phrases (e.g., second mnemonic phrases).

According to an embodiment, upon generating the mnemonic phrase according to input of the user phrase, the processor 120 may first calculate the resultant value of the user phrase and apply the resultant value to the designated portion 421 (*a*) of FIG. 4D, designated portion 423 (*b*), or designated portion 425 (*c*) in the entropy of the mnemonic phrase. Next, the remaining parts (431, 433, or 435) to which the result value is not reflected may be generated as a random value and may set the number of lengths (e.g., second number) corresponding to the generated random value to generate a set number (e.g., second number) of mnemonic phrases (e.g., second mnemonic phrases).

According to an embodiment, if the user phrase is additionally input, the length of the mnemonic phrase of the rest 431, 433, or 435 of the entropy is recalculated, so that the processor 120 may generate mnemonic phrase (e.g., third mnemonic phrase) of the reset mnemonic phrase number (e.g., third number).

According to an embodiment, the processor 120 may create a backup table for the generated second mnemonic phrase (or the third mnemonic phrase) and may store the created backup table in the memory 130. The processor 120 may use the stored backup table when there is a request for private key backup or restoration. The processor 120 may easily move all the keys of the user when moving to another wallet through sending and importing to/from the wallet by means of the stored backup table.

According to an embodiment, the processor 120 may control the display module 160 to display guide information to guide to memorize or record and keep, in a place other than the electronic device, the user phrase and/or generated second mnemonic phrase (or third mnemonic phrase).

Figure 5A:
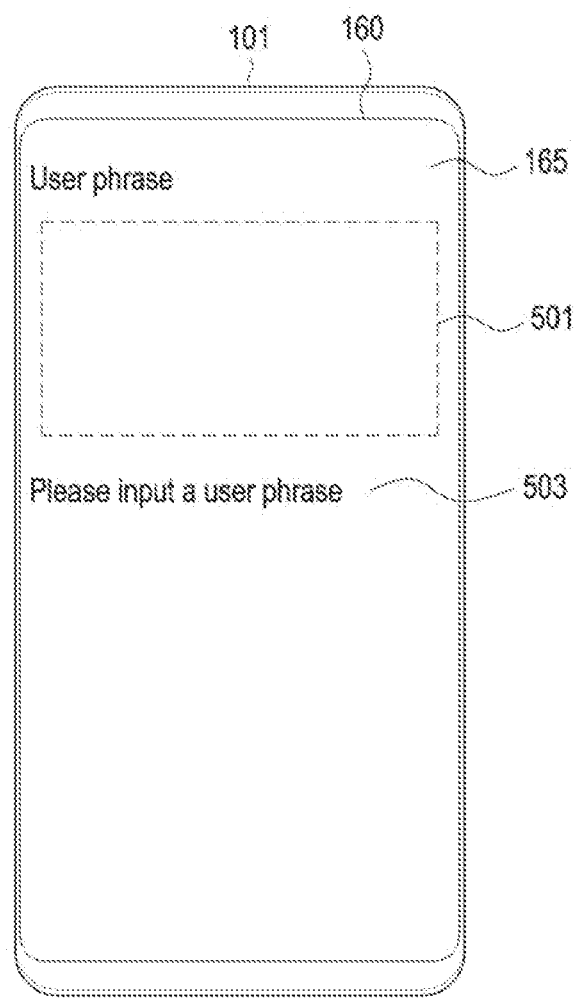
FIGS. 5A and 5B are views illustrating an example of restoring a private key in an electronic device according to an embodiment.
Figure 5B:
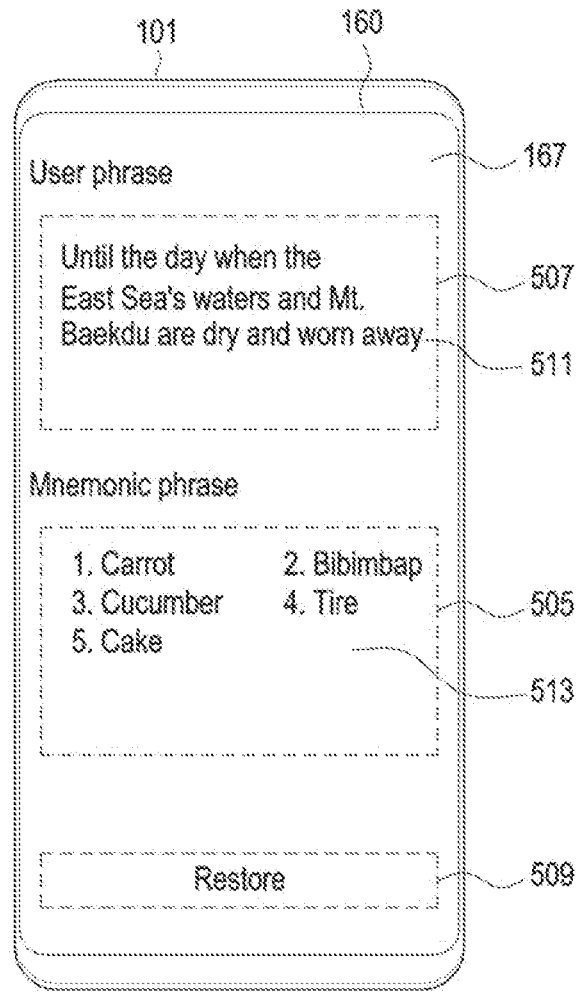

FIGS. 5A and 5B are views illustrating an example of restoring a private key in an electronic device according to an embodiment.

Referring to FIGS. 1, 2, 5A, and 5B, according to an embodiment, in response to a private key restoration request, the processor 120 may perform the operation for restoring the private key based on the mnemonic phrase memorized or separately kept by the user (e.g., corresponding to the user phrase that was input when generating the mnemonic phrase). As shown in FIG. 5A, the processor 120 may display, on a screen 165 for restoring the private key, an object 501 for receiving the user phrase and guide information 503 prompting input of the user phrase. As shown in FIG. 5B, the processor 120 may receive the input user phrase (e.g., "Until the day when the East Sea's waters and Mt. Baekdu are dry and worn away") 511 as input by the user, determine the security level by analyzing the received user phrase 511, and set a number (e.g., the second number) for the mnemonic phrase, based on the determined security level. When the input user phrase 511 includes a typo, the processor 120 may prompt the user to correct the typo and reset the number for the mnemonic phrase, based on the corrected user phrase 511. In some embodiments, when the processor 120 performs the restoration operation, the operation of prompting correcting typos may be omitted.

According to an embodiment, the processor 120 may control the display module 160 to display, on the screen 167, an object 505 (e.g., a field) related to the mnemonic phrase to facilitate reception of the mnemonic phrase (e.g., the second mnemonic phrase or third mnemonic phrase), including the set number of words from the user, information about the set number, and prompts for guiding input of the mnemonic phrase. The processor 120 may receive the memorized or separately kept mnemonic phrase (e.g., the second mnemonic phrase or third mnemonic phrase) 513. For example, when the user phrase is input, the processor 120 may retrieve the mnemonic phrase from the backup table stored in the memory 130 based on the user phrase and display the same.

According to an embodiment, the processor 120 may control the display module 160 to display the restore button 509 on the screen 167. In response to detecting selection of the restore button 509, the processor 120 may generate (or restore) a private key based on the mnemonic phrase 513 (having the set number of words) and the input user phrase 511, and store the generated restored private key in the memory 130 (e.g., in a secure area of partition thereof). The processor 120 may repeated performance of the operations for input of the user phrase input and/or mnemonic phrase, until a restoration complete request is received from the user (e.g., input selection of the restore button 509).

Major components of the electronic device 101 have been described above in connection with FIGS. 1 and 2. According to an embodiment, however, all of the components of FIGS. 1 and 2 are not essential components, and the electronic device 101 may be implemented with more or less components than those shown. The positions of the major components of the electronic device 101 described above in connection with FIGS. 1 and 2 may be varied according to certain embodiments of the present invention.

According to an embodiment, an electronic device (e.g., the electronic device 101 of FIGS. 1, 2, 3, 4A to 4D, and 5A and 5B) may include a memory (e.g., the memory 130 of FIG. 1), a display module (e.g., the display module 160 of FIGS. 1, 3, 4A to 4D, and 5A and 5B), and at least one processor (e.g., the processor 120 of FIG. 1) electrically connected with the memory and the display module. The memory may store instructions configured to, when executed, enable the at least one processor to generate a private key and a public key, generate a first mnemonic phrase including a designated first number of words based on a structure of the private key, identify a user phrase input by a user, generate a second mnemonic phrase including a second number (smaller than the first number) of words based on a security level obtained by analyzing the user phrase, and control the display module to display the generated second mnemonic phrase.

According to an embodiment, the instructions may be further configured to enable the at least one processor to newly generate the private key by combining the user phrase and the second mnemonic phrase.

According to an embodiment, the private key and the public key may be newly generated whenever the user phrase is additionally input or re-input or whenever the number of the mnemonic phrases is varied.

According to an embodiment, the instructions may be configured to enable the at least one processor to control the display module to display the generated first mnemonic phrase.

According to an embodiment, the instructions may be configured to enable the at least one processor to control the display module to display information related to a security level for the second mnemonic phrase on a screen displaying the second mnemonic phrase. The screen displaying the second mnemonic phrase may be configured to be impossible to capture.

According to an embodiment, the instructions may be configured to enable the at least one processor to control the display module to display information leading to additional input of the user phrase when the security level is low, generate a third number of third mnemonic phrases based on a security level obtained by analyzing the additionally input user phrase, and control the display module to display the generated third mnemonic phrases. The third number may be set to a value smaller than the first number and larger than the second number.

According to an embodiment, the instructions may be configured to enable the at least one processor to control the display module to display guide information about storage of the user phrase, in response to an input complete request.

According to an embodiment, the instructions may be configured to enable the at least one processor to correct some text of the user phrase when the user phrase is input, and control the display module to display a user phrase to which the corrected some text has been applied.

According to an embodiment, the instructions may be configured to enable the at least one processor to identify the second number based on a security level obtained by analyzing the user phrase for key restoration input from the user in response to a private key restoration request, control the display module to display information about the second number, identify the second mnemonic phrase input from the user based on the information about the second number, restore the private key based on the input user mnemonic phrase and the input second mnemonic phrase, and store or back up the restored private key.

According to an embodiment, the instructions may be configured to enable the at least one processor to control the display module to display information requesting to correct some text of the user phrase for the key restoration.

Now described is an operation method in the above-described electronic device with reference to the drawings.

Figure 6:
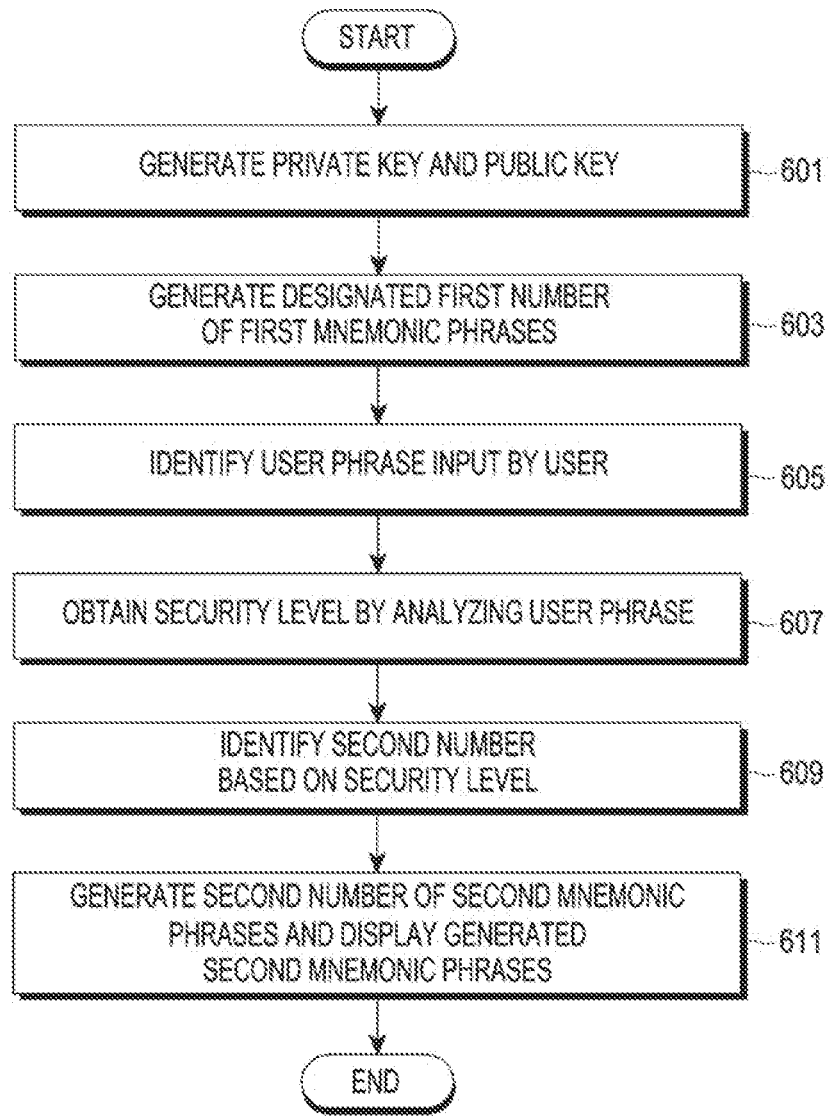
FIG. 6 is a view illustrating an example of an operation method in an electronic device according to an embodiment.

FIG. 6 is a view illustrating an example of an operation method in an electronic device according to an embodiment.

Referring to FIG. 6, according to an embodiment, an electronic device (e.g., the electronic device 101 of FIGS. 1, 2, 3, 4A to 4D, 5A, and 5B) may generate a private key and a public key in response to a mnemonic phrase generation request (e.g., start button input) from the user in operation 601. The electronic device may generate a private key and a public key according to a configured structure to implement a wallet of a security system. For example, the private key and the public key may be generated by an ECDSA or an encryption algorithm having the same concept.

In operation 603, the electronic device may generate a mnemonic phrase (hereinafter, referred to as a first mnemonic phrase) corresponding to the generated private key. The first mnemonic phrase may include a designated first number of (e.g., 12 or more) words. The electronic device may display the generated first mnemonic phrase on the display module (e.g., the display module 160 of FIGS. 1, 3, 4A to 4D, 5A, and 5B). Here, the mnemonic phrase may be a word sequence of words randomly generated in any number, used as a key (or seed) utilized to derive a wallet of a cryptographic system. For example, as shown in FIG. 3, the electronic device may randomly generate the first mnemonic phrase (e.g., the first mnemonic phrase 301 of FIG. 3) with words easy for the user to recognize (e.g., carrot, bibimbap, cucumber, tire, cake, notebook, Hyundai, Orion, Samsung, vitamin, Americano and shampoo) and change and generate it every time the private key is created. The electronic device may control the display module to display guide information related to the input of the user phrase before receiving the user phrase from the user.

In operation 605, the electronic device may identify a user phrase (e.g., a user credential) input by the user. As shown in FIG. 4A, the electronic device may display the input user phrase (e.g., "Until the day when the East Sea's waters and Mt. Baekdu is dry and worn away") on the screen (e.g., the screen 163 of FIG. 4A) of the application displayed on the display module. When performing operation 605, as shown in FIG. 4B, the electronic device may correct at least one of the typos, spaces, nonstandard characters, or unsupported characters from the input user phrase (e.g., "Until the day when the East Sea's waters and Mt. Baekdu is dry and worn away") (e.g., correct "is" in "Mt. Baekdu is dry" into "are"). The electronic device may display the corrected text-applied user phrase ("Until the day when the East Sea's waters and Mt. Baekdu are dry and worn away") on the display module. For example, if there is no text to be corrected in the input user phrase, the electronic device may maintain the display of the input user phrase.

In operation 607, the electronic device may analyze the input (e.g., in some examples, corrected to remove typos and other errors) user phrase and obtain a security level according to the analysis result. Here, the security level may mean the security degree (or strength) of the private key to be generated by combining the user phrase and the mnemonic phrase, and it may be represented to be visually identified by the user.

In operation 609, the electronic device may identify a second number, which is a number utilized for generating the mnemonic phrase, based on the obtained security level and may generate a second mnemonic phrase including the identified second number of words. Here, the second number may be set to be smaller than the first number. For example, as shown in FIG. 4B, the electronic device may generate the second mnemonic phrase (e.g., the second mnemonic phrase 403 of FIG. 4B) to include the set second number of words (e.g., carrot, bibimbap, cucumber, tire, and cake) and may display the generated second mnemonic phrase on the display module. For example, the electronic device may generate the second mnemonic phrase by sequentially or randomly selecting the second number of words of the first mnemonic phrase. As another example, the electronic device may randomly generate new words for the second mnemonic phrase, separately from the first mnemonic phrase.

In operation 611, the electronic device may display the generated second mnemonic phrase on the display module, and terminate the operation. For example, when the input of the user phrase is completed, the electronic device may generate a second number of second mnemonic phrases, newly generated, instead of the first mnemonic phrase displayed in the mnemonic phrase display area. As another example, the electronic device may sequentially display the words included in the second mnemonic phrase according to the length of the inputted user phrase while the user phrase is being input and, if the input of the user phrase is completed, may display all words of the final calculated number (e.g., the second number) included in the second mnemonic phrase.

Figure 7:
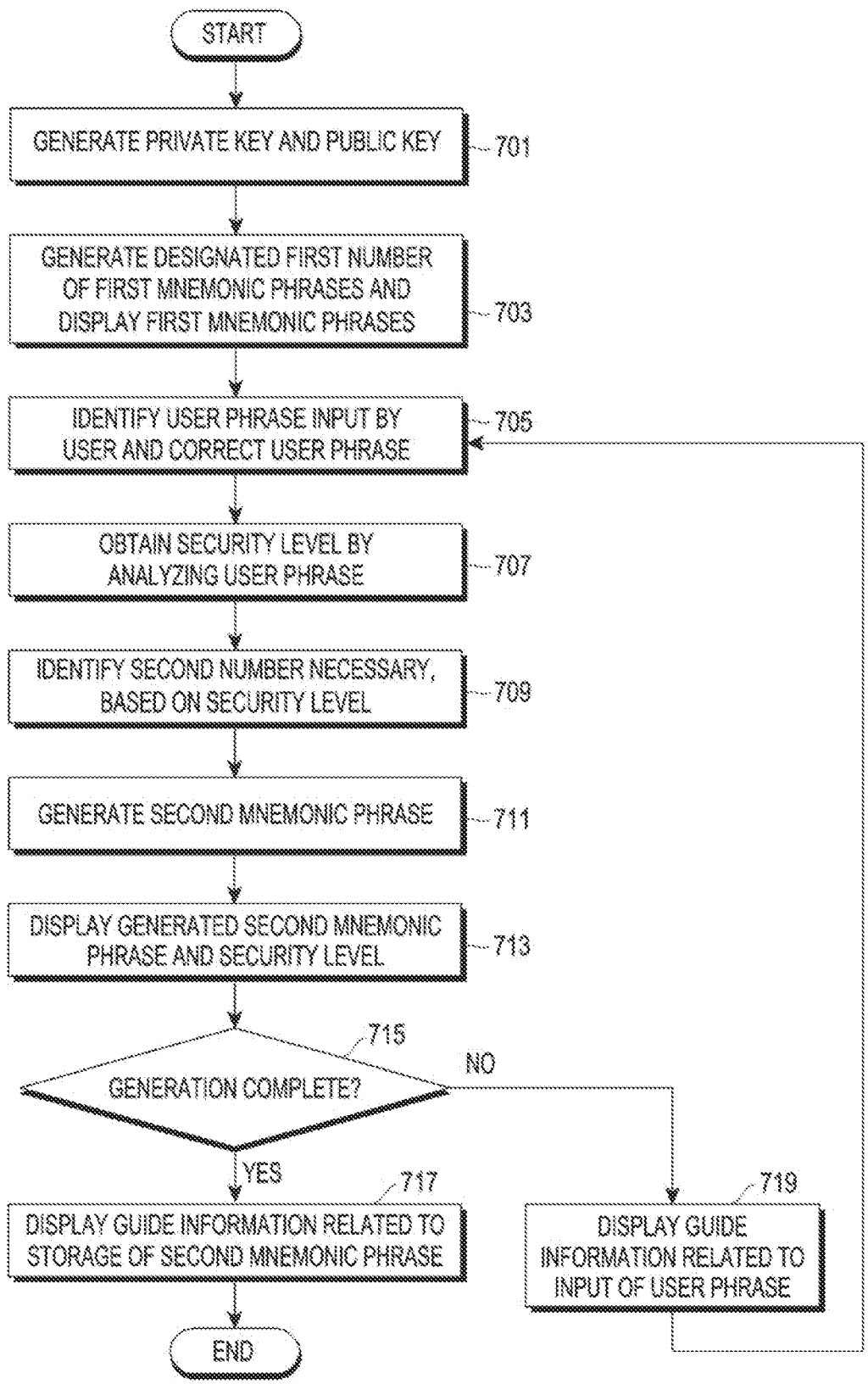
FIG. 7 is a view illustrating an example of an operation method in an electronic device according to an embodiment.

FIG. 7 is a view illustrating an example of an operation method in an electronic device according to an embodiment.

Referring to FIG. 7, according to an embodiment, an electronic device (e.g., the electronic device 101 of FIGS. 1, 2, 3, 4A to 4D, 5A, and 5B) may generate a private key and a public key in response to a mnemonic phrase generation request (e.g., receiving selection of a start button) from the user in operation 701. The electronic device may generate a private key and a public key according to a configured structure to implement a wallet of a security system. For example, the private key and the public key may be generated by an elliptic curve digital signature algorithm (ECDSA) or an encryption algorithm having the same concept. According to certain embodiments, operation 701 of generating the private key and the public key may be omitted, and the private key and public key may be generated whenever the user phrase is input (e.g., additionally input or reinput), whenever the number of mnemonic phrases is changed, or when there is a mnemonic phrase generation complete request (e.g., input of the complete button). According to certain embodiments, in operation 701, the electronic device may generate an initial private key and an initial public key and then generate a new private key again based on the user phrase and newly generated mnemonic phrase (e.g., the second mnemonic phrase or third mnemonic phrase) whenever the user phrase is input (e.g., additional input or reinput), whenever the number of mnemonic phrases is changed, or when there is a mnemonic phrase generation complete request (e.g., input of the complete button), and generate a new public key based on the newly generated private key.

In operation 703, the electronic device may generate a mnemonic phrase (hereinafter, referred to as a first mnemonic phrase) corresponding to the generated private key. The first mnemonic phrase may include a designated first number of (e.g., 12 or more) words based on the structure of the private key. The electronic device may display the generated first mnemonic phrase on the display module (e.g., the display module 160 of FIGS. 1, 3, 4A to 4D, 5A, and 5B). Here, the mnemonic phrase may be a word sequence of words randomly generated in any number, used as a key (or seed) utilized to derive a wallet of a cryptographic system. For example, as shown in FIG. 3, the electronic device may randomly generate the first mnemonic phrase (e.g., the first mnemonic phrase 301 of FIG. 3) with words easy for the user to recognize (e.g., carrot, bibimbap, cucumber, tire, cake, notebook, Hyundai, Orion, Samsung, vitamin, Americano and shampoo) and change and generate it every time the private key is created. The electronic device may control the display module 160 to display information (e.g., "Please input a user phrase") to guide input of the user phrase before receiving the user phrase from the user.

In operation 705, the electronic device may identify the user phrase (e.g., user credential) input by the user. As shown in FIG. 4A, the electronic device may display the input user phrase (e.g., "Until the day when the East Sea's waters and Mt. Baekdu is dry and worn away") on the screen (e.g., the screen 163 of FIG. 4A) of the application displayed on the display module. When performing operation 705, as shown in FIG. 4B, the electronic device may correct at least one of the typos, spaces, nonstandard characters, or unsupported characters from the input user phrase (e.g., "Until the day when the East Sea's waters and Mt. Baekdu is dry and worn away") (e.g., the word "is" in "Mt. Baekdu is dry" is corrected to "are"). The electronic device may display the corrected text-applied user phrase ("Until the day when the East Sea's waters and Mt. Baekdu are dry and worn away") on the display module. For example, if there is no text to be corrected in the input user phrase, the electronic device may maintain the display of the input user phrase.

In operation 707, the electronic device may analyze the input (or corrected) user phrase and obtain a security level according to the analysis result. Here, the security level may indicate a degree of strength of security afforded by the private key generated by combining the user phrase and the mnemonic phrase. the security level may be represented to be visually identified by the user.

In operation 709, the electronic device may identify a second number for generating of the mnemonic phrase based on the obtained security level. Here, the second number may be smaller than the first number.

In operation 711, the electronic device may generate a second mnemonic phrase including the set second number of words. For example, as shown in FIG. 4B, the electronic device may generate the second mnemonic phrase (e.g., the second mnemonic phrase 403 of FIG. 4B) to include the second number of words (e.g., carrot, bibimbap, cucumber, tire, and cake) and may display the generated second mnemonic phrase on the display module. For example, the electronic device may generate the second mnemonic phrase by sequentially or randomly selecting the second number of words of the first mnemonic phrase. As another example, the electronic device may randomly generate new words for the second mnemonic phrase, separately from the first mnemonic phrase.

In operation 713, the electronic device may display the generated second mnemonic phrase on the display module. When displaying the generated second mnemonic phrase, the electronic device may display information related to the security level (e.g., at least one of text, color, symbol or image) and guide information related to memorizing or storing the second mnemonic phrase on the display module. For example, when the input of the user phrase is completed, the electronic device may generate a second number of second mnemonic phrases, newly generated, instead of the first mnemonic phrase displayed in the mnemonic phrase display area. As another example, the electronic device may sequentially display the words included in the second mnemonic phrase according to the length of the inputted user phrase while the user phrase is being input and, if the input of the user phrase is completed, may display all words of the final calculated number (e.g., the second number) included in the second mnemonic phrase. For example, when the security level is larger than or equal to a designated threshold, the electronic device may control the display module 160 to display text (e.g., "high" and/or blue) indicating a safe level of the security level. For example, if the security level is less than the designated threshold, the processor 120 may control the display module 160 to display text (e.g., "low" and/or red) indicating that the security level is not safe or guide information, such as "Please input additional user phrase."

In operation 715, the electronic device may identify whether generation of the mnemonic phrase is complete. When mnemonic phrase generation is completed, the electronic device may perform operation 717. When the mnemonic phrase generation is not completed, the electronic device may perform operation 719.

In operation 717, the electronic device may display guide information (e.g., a prompt) related to storage of the second mnemonic phrase and terminate the operation. The electronic device may apply the user phrase to a portion of the private key generated in operation 701 in operation 713 or operation 717 and apply the number of mnemonic phrases, with the changed second number, to the private key and store it. According to certain embodiments, if the initial private key is not generated in operation 701, the electronic device may generate a new private key based on the user phrase and the generated second mnemonic phrase in operation 713 or operation 717.

In operation 719, if mnemonic phrase generation is determined to be incomplete, the electronic device may display guide information (e.g., a prompt) for input of the user phrase (e.g., additional input or reinput) on the display module and reperform operation 705.

In the above-described operation method of FIGS. 6 and 7, when the security level is low, the electronic device may display guide information, such as "Please input an additional user phrase," analyze the user phrase additionally input by the user to obtain a security level again, generate a third number of third mnemonic phrases based on the obtained security level, and display the generated third mnemonic phrase on the display module. Here, the third number may be set to a value smaller than the first number and larger than the second number.

Figure 8:
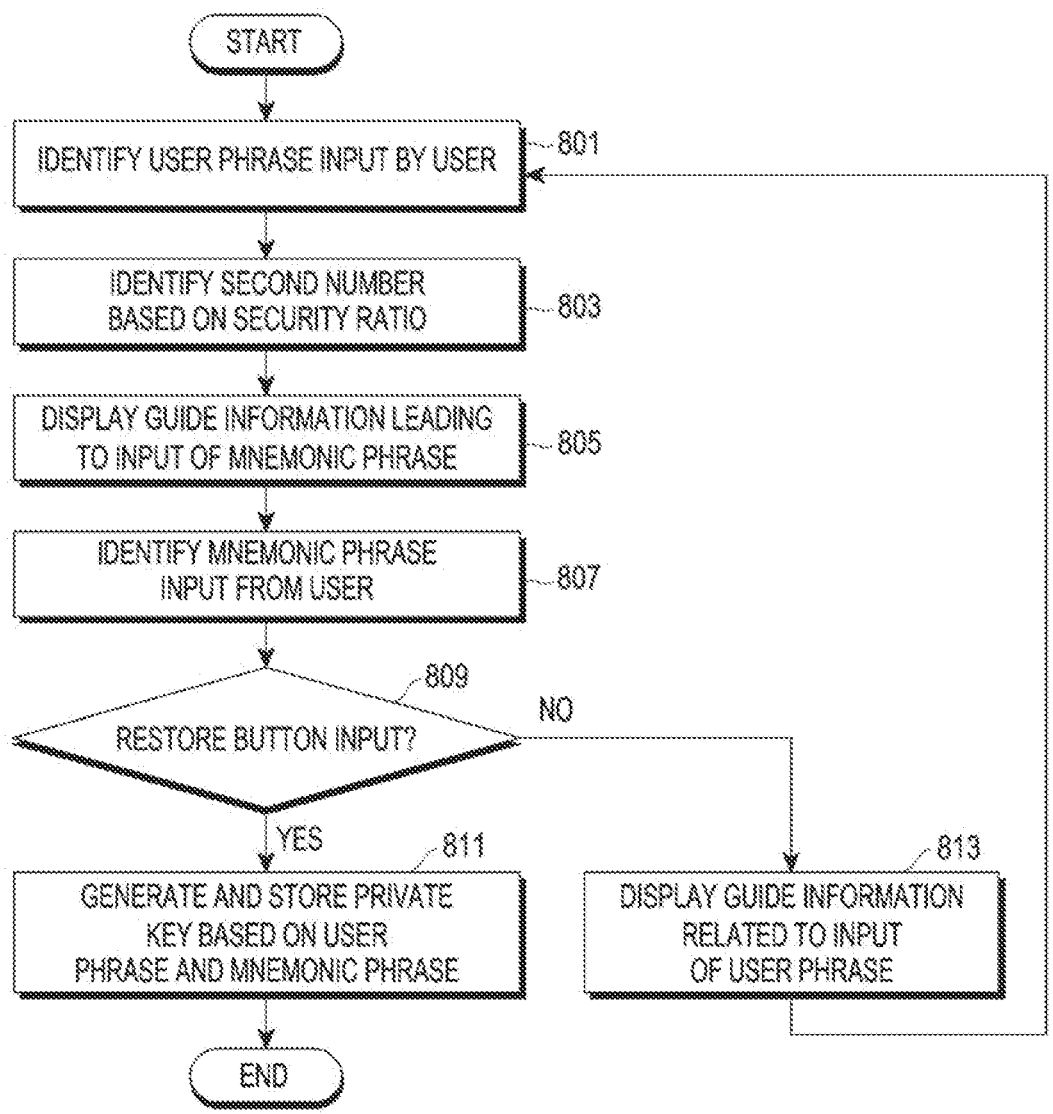
FIG. 8 is a view illustrating an example of an operation method in an electronic device according to an embodiment.

FIG. 8 is a view illustrating an example of an operation method in an electronic device according to an embodiment.

Referring to FIG. 8, according to an embodiment, the electronic device (e.g., the electronic device 101 of FIGS. 1, 2, 3, 4A to 4D, 5A and 5B) may perform the operation for private key restoration based on the mnemonic phrase memorized or separately stored, corresponding to the user phrase input when generating the mnemonic phrase in response to the private key restoration request.

In operation 801, the electronic device may identify the user phrase input by the user. As shown in FIG. 5A, the electronic device may display, on the screen (e.g., the screen 165 of FIG. 5B) for restoring the private key, an object (the object 501 of FIG. 5A) for receiving the user phrase and guide information (the guide information 503 of FIG. 5A) to guide input the user phrase. As shown in FIG. 5B, the electronic device may display the user phrase (e.g., "Until the day when the East Sea's waters and Mt. Baekdu are dry and worn away") (e.g., the user phrase 511 of FIG. 5B) input from the user on the display module (e.g., the display module 160 of FIGS. 1, 3, 4A to 4D, 5A, and 5B). When performing operation 801, if the input user phrase has a typo, the electronic device may request the user to correct the typo and display the typo-corrected user phrase on the display module. For example, the electronic device may omit the operation of correcting typos for input of a precise user phrase.

In operation 803, the electronic device may obtain a security level by analyzing the user phrase and identifying a number (e.g., a second number) for the mnemonic phrase, based on the obtained security level.

In operation 805, the electronic device may display guide information prompting input of the mnemonic phrase and information about the number identified to be able to receive the mnemonic phrase (e.g., the second mnemonic phrase or third mnemonic phrase) including the words of the numbered identified by the user.

In operation 807, the electronic device may identify the mnemonic phrase (e.g., the second mnemonic phrase or the third mnemonic phrase) 513 input by the user. The mnemonic phrase input by the user may be a second mnemonic phrase or a third mnemonic phrase that is generated in the mnemonic phrase generating operation described with reference to FIGS. 6 and 7 and memorized or stored separately by the user.

In operation 809, the electronic device may identify whether a restoration request is generated via input selection of a restore button from the user.

As a result of identification in operation 809, if a restoration request is generated, then in operation 811, the electronic device may generate (or restore) a private key based on the input user phrase and mnemonic phrase and safely store the generated private key in the memory (e.g., the memory 130 of FIG. 1) and terminate the operation.

As a result of identification in operation 809, if there is no restoration request, in operation 813, the electronic device may perform operation 801 again after displaying guide information to guide the user to re-enter the user phrase or input an additional user phrase.

According to an embodiment, a method for operation in an electronic device (e.g., the electronic device 101 of FIGS. 1, 2, 3, 4A to 4D, and 5A and 5B) may include generating a private key and a public key, generating a first mnemonic phrase including a designated first number of words based on a structure of the private key, identifying a user phrase input by a user, generating a second mnemonic phrase including a second number (smaller than the first number) of words based on a security level obtained by analyzing the user phrase, and displaying the generated second mnemonic phrase on a display module (e.g., the display module 160 of FIGS. 1, 3, 4A to 4D, 5A, and 5B) of the electronic device.

According to an embodiment, the method may further include displaying the generated first mnemonic phrase on the display module and newly generating the private key by combining the user phrase and the second mnemonic phrase.

According to an embodiment, the method may further include displaying information related to a security level for the second mnemonic phrase on a screen displaying the second mnemonic phrase. The screen displaying the second mnemonic phrase may be configured to be impossible to capture.

According to an embodiment, the method may further include displaying information leading to additional input of the user phrase on the display module, when the security level is low; generating a third number of third mnemonic phrases based on a security level obtained by analyzing the additionally input user phrase, and displaying the generated third mnemonic phrases on the display module. The third number may be set to a value smaller than the first number and larger than the second number.

According to an embodiment, the method may further include displaying guide information about storage of the user phrase on the display module in response to an input complete request.

According to an embodiment, the method may further include correcting some text of the user phrase when the user phrase is input and displaying the user phrase to which the corrected some text has been applied on the display module.

According to an embodiment, the private key and the public key may be newly generated whenever the user phrase is additionally input or re-input or whenever the number of the mnemonic phrases is varied.

According to an embodiment, the method may further include identifying the second number based on a security level obtained by analyzing the user phrase for key restoration input from the user in response to a private key restoration request, displaying information about the second number on the display module, identifying the second mnemonic phrase input from the user based on the information about the second number, restoring the private key based on the input user mnemonic phrase and the input second mnemonic phrase, and storing or backing up the restored private key.

According to an embodiment, the method may further include displaying, on the display module, information requesting to correct some text of the user phrase for the key restoration.

According to an embodiment, there may be provided a non-transitory storage medium storing one or more program, the one or more program comprising executable instructions configured to, when executed by at least one processor an electronic device, cause the electronic device to execute to execute generating a private key and a public key, generating a first mnemonic phrase including a designated first number of words based on a structure of the private key, identifying a user phrase input by a user, generating a second mnemonic phrase including a second number (smaller than the first number) of words based on a security level obtained by analyzing the user phrase, and displaying the generated second mnemonic phrase on a display module of the electronic device.

The embodiments disclosed herein are proposed for description and understanding of the disclosed technology and does not limit the scope of the disclosure. Accordingly, the scope of the disclosure should be interpreted as including all changes or certain embodiments based on the disclosure.

The electronic device according to certain embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above. It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a memory;
a display; and
at least one processor electrically connected with the memory and the display,
wherein the memory stores instructions that, when executed by the at least one processor, cause the electronic device to:
generate a private key and a public key,
generate a first mnemonic phrase including first words of a designated first number based on a structure of the private key,
obtain a user phrase via user input,
generate a second mnemonic phrase including second words of a second number, wherein the second number is set based on a security level determined by analyzing the user phrase, wherein the second words are a subset of the first words,
control the display to display the second mnemonic phrase.

2. The electronic device of claim 1, wherein the memory stores the instructions that, when executed by the at least one processor, cause the electronic device to,
newly generate the private key by combining the user phrase and the second mnemonic phrase,
wherein the second number is set to a value smaller than the first number.

3. The electronic device of claim 1, wherein the private key and the public key are newly generated whenever the user phrase is additionally input or re-input or whenever a number of the mnemonic phrases is varied.

4. The electronic device of claim 1, wherein the memory stores the instructions that, when executed by the at least one processor, cause the electronic device to:
control the display to display the generated first mnemonic phrase.

5. The electronic device of claim 1, wherein the memory stores the instructions that, when executed by the at least one processor, cause the electronic device to:
control the display to display information related to a security level for the second mnemonic phrase on a screen displaying the second mnemonic phrase, and
wherein the screen displaying the second mnemonic phrase is configured to be impossible to capture.

6. The electronic device of claim 5, wherein the memory stores the instructions that, when executed by the at least one processor, cause the electronic device to:
control the display to display information leading to additional input of the user phrase when the security level is low,
generate a third number of third mnemonic phrases based on a security level obtained by analyzing the additionally input user phrase, and
control the display to display the generated third mnemonic phrases,
wherein the third number is set to a value smaller than the first number and larger than the second number.

7. The electronic device of claim 1, wherein the memory stores the instructions that, when executed by the at least one processor, cause the electronic device to:
control the display to display guide information related to storage of the user phrase, in response to receiving an input completion request.

8. The electronic device of claim 1, wherein the memory stores the instructions that, when executed by the at least one processor, cause the electronic device to:
correct some text of the user phrase when the user phrase is input, and
control the display to display a user phrase to which the corrected some text has been applied.

9. The electronic device of claim 1, wherein the memory stores the instructions that, when executed by the at least one processor, cause the electronic device to:

identify the second number based on a security level obtained by analyzing the user phrase for key restoration input from the user in response to a private key restoration request, control the display to display information about the second number, identify the second mnemonic phrase input from the user based on the information about the second number, restore the private key based on the input user mnemonic phrase and the input second mnemonic phrase, and store or back up the restored private key.

10. The electronic device of claim 9, wherein the memory stores the instructions that, when executed by the at least one processor, cause the electronic device to, control the display to display information requesting to correct some text of the user phrase for the key restoration.

11. A method for operation in an electronic device, the method comprising:

generating a private key and a public key;

generating a first mnemonic phrase including first words of a designated first number based on a structure of the private key;

obtaining a user phrase via user input;

generating a second mnemonic phrase including second words of a second number, wherein the second number is set based on a security level determined by analyzing the user phrase, wherein the second words are a subset of the first words; and displaying the generated second mnemonic phrase on a display of the electronic device.

12. The method of claim 11, further comprising:

displaying the generated first mnemonic phrase on the display; and newly generating the private key by combining the user phrase and the second mnemonic phrase, wherein the second number is set to a value smaller than the first number.

13. The method of claim 11, further comprising displaying information related to a security level for the second mnemonic phrase on a screen displaying the second mnemonic phrase, wherein the screen displaying the second mnemonic phrase is configured to be impossible to capture.

14. The method of claim 13, further comprising:

displaying information leading to additional input of the user phrase on the display, when the security level is low;

generating a third number of third mnemonic phrases based on a security level obtained by analyzing the additionally input user phrase; and displaying the generated third mnemonic phrases on the display, wherein the third number is set to a value smaller than the first number and larger than the second number.

15. The method of claim 11, further comprising displaying guide information about storage of the user phrase on the display in response to an input complete request.

16. The method of claim 11, further comprising:

correcting some text of the user phrase when the user phrase is input; and displaying the user phrase to which the corrected some text has been applied on the display.

17. The method of claim 11, wherein the private key and the public key are newly generated whenever the user phrase is additionally input or re-input or whenever a number of the mnemonic phrases is varied.

18. The method of claim 11, further comprising:

identifying the second number based on a security level obtained by analyzing the user phrase for key restoration input from the user in response to a private key restoration request;

displaying information about the second number on the display;

identifying the second mnemonic phrase input from the user based on the information about the second number;

restoring the private key based on the input user mnemonic phrase and the input second mnemonic phrase; and storing or backing up the restored private key.

19. The method of claim 18, further comprising displaying, on the display, information requesting to correct some text of the user phrase for the key restoration.

20. A non-transitory storage medium storing one or more program, the one or more program including executable instructions executable by at least one processor of an electronic device to cause the electronic device to:

generate a private key and a public key, generate a first mnemonic phrase including first words of a designated first number based on a structure of the private key, obtain a user phrase via user input, generate a second mnemonic phrase including second words of a second number, wherein the second number is set based on a security level determined by analyzing the user phrase, and wherein the second words are a subset of the first words; and display the generated second mnemonic phrase on a display of the electronic device.

* * * * *